(12) United States Patent
Park et al.

(10) Patent No.: US 7,600,811 B2
(45) Date of Patent: Oct. 13, 2009

(54) CUSHION TABLE STRUCTURE OF PASSENGER SEAT

(75) Inventors: Woo Chul Park, Gyeonggi-do (KR); Tae Soo Kim, Gyeonggi-do (KR)

(73) Assignees: Hyundai Motor Company, Seoul (KR); Daewon San Up Co., Ltd., Gyeonggi-do (KR)

( * ) Notice: Subject to any disclaimer, the term of this patent is extended or adjusted under 35 U.S.C. 154(b) by 0 days.

(21) Appl. No.: 11/726,667

(22) Filed: Mar. 21, 2007

(65) Prior Publication Data

US 2008/0136220 A1    Jun. 12, 2008

(30) Foreign Application Priority Data

Dec. 7, 2006   (KR)   .................. 10-2006-0124137

(51) Int. Cl.
*A47B 83/02* (2006.01)
*B60N 3/00* (2006.01)

(52) U.S. Cl. .................. 297/144; 297/120; 297/173; 296/37.15

(58) Field of Classification Search .................. 297/120, 297/144, 173, 188.1, 284.11; 296/37.15
See application file for complete search history.

(56) References Cited

U.S. PATENT DOCUMENTS

| | | | | |
|---|---|---|---|---|
| 2,730,423 A | * | 1/1956 | Mock | .................. 312/334.22 |
| 4,341,418 A | * | 7/1982 | Chappell | .................. 297/144 |
| 4,417,764 A | * | 11/1983 | Marcus et al. | .................. 297/188.17 |
| 4,799,731 A | * | 1/1989 | Brown | .................. 297/188.12 |
| 4,946,120 A | * | 8/1990 | Hatcher | .................. 248/183.2 |
| 5,997,083 A | | 12/1999 | Ono et al. | |
| 6,113,187 A | | 9/2000 | Sugiyama et al. | |
| 6,135,549 A | * | 10/2000 | Demick et al. | .................. 297/188.1 |
| 6,386,629 B1 | | 5/2002 | Severinski et al. | |
| 6,406,084 B1 | | 6/2002 | de Campos et al. | |
| 6,419,313 B1 | | 7/2002 | Newman | |
| 6,869,121 B2 | * | 3/2005 | Kayumi et al. | .................. 296/37.15 |

FOREIGN PATENT DOCUMENTS

| | | |
|---|---|---|
| JP | 06-286509 | 10/1994 |
| JP | 11-240363 | 9/1999 |

* cited by examiner

*Primary Examiner*—Joseph F Edell
(74) *Attorney, Agent, or Firm*—Edwards Angell Palmer & Dodge LLP; Peter F. Corless

(57) ABSTRACT

Disclosed is a cushion table structure of a passenger seat for a vehicle, which includes a seat back and a seat cushion, the structure comprising: (a) a division rotating part which is a divided portion of the seat cushion and has a rotatable structure; (b) a fixed type table and a sliding type table which are coupled to a bottom surface of the division rotating part; and (c) a tray which is disposed in an empty space which is generated when the division rotating part rotates in a forward direction.

6 Claims, 4 Drawing Sheets

[FIG. 1]
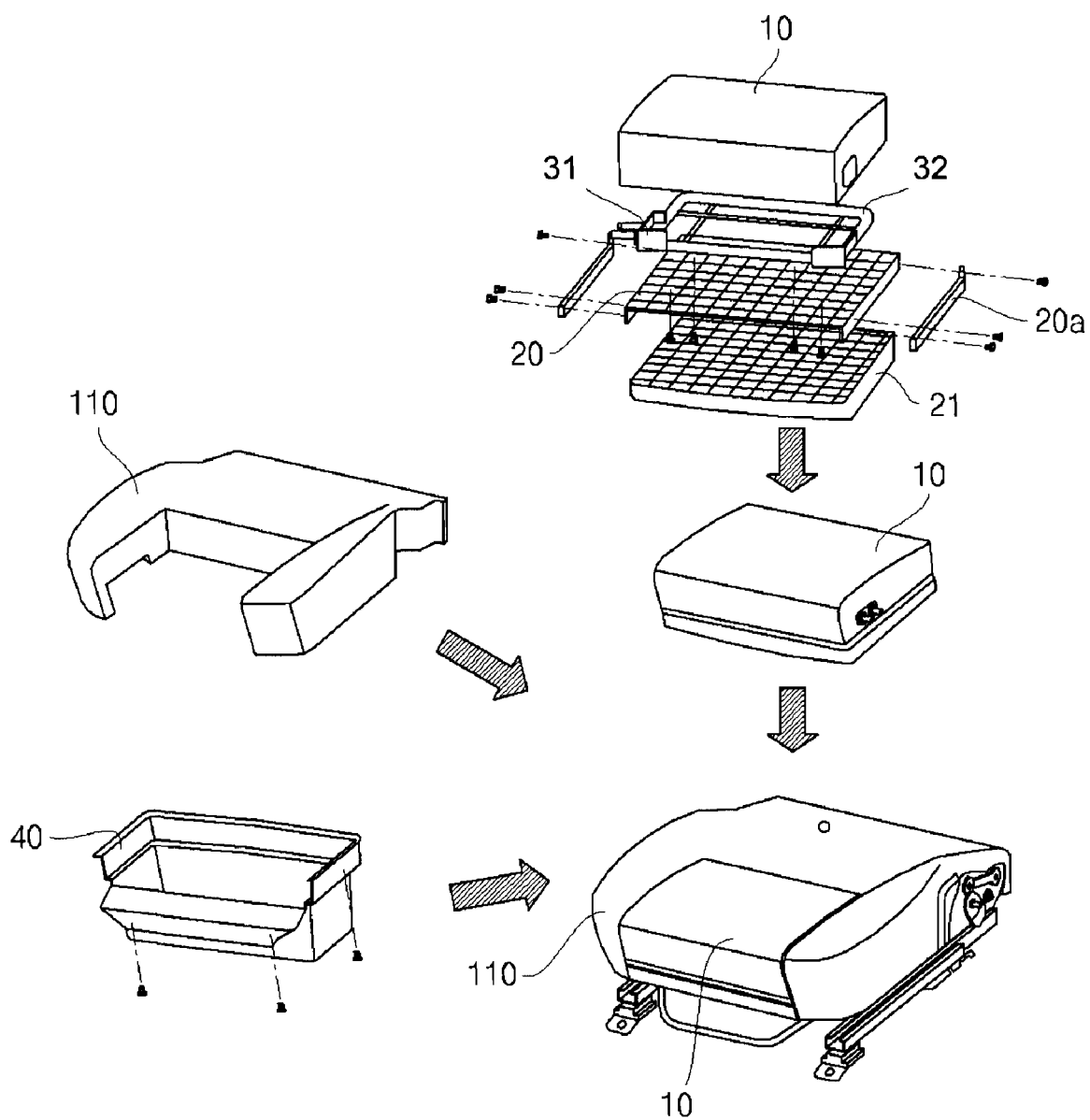

[FIG. 2]
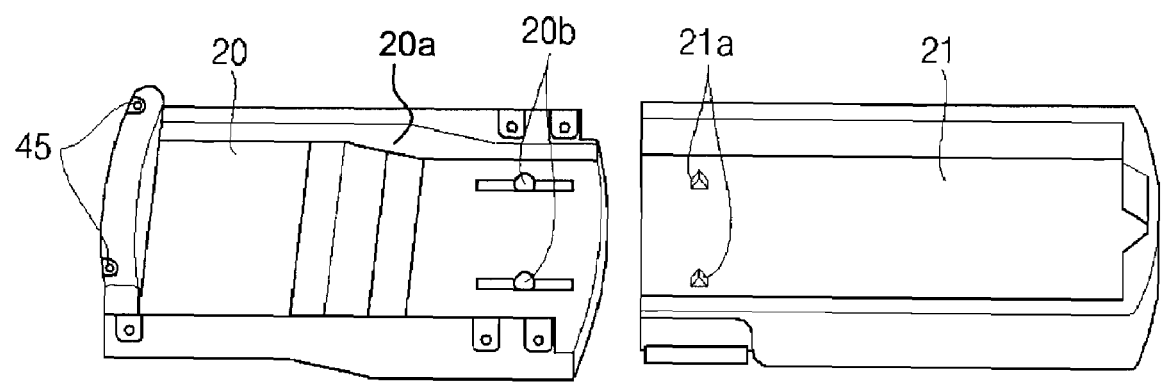
[FIG. 3]
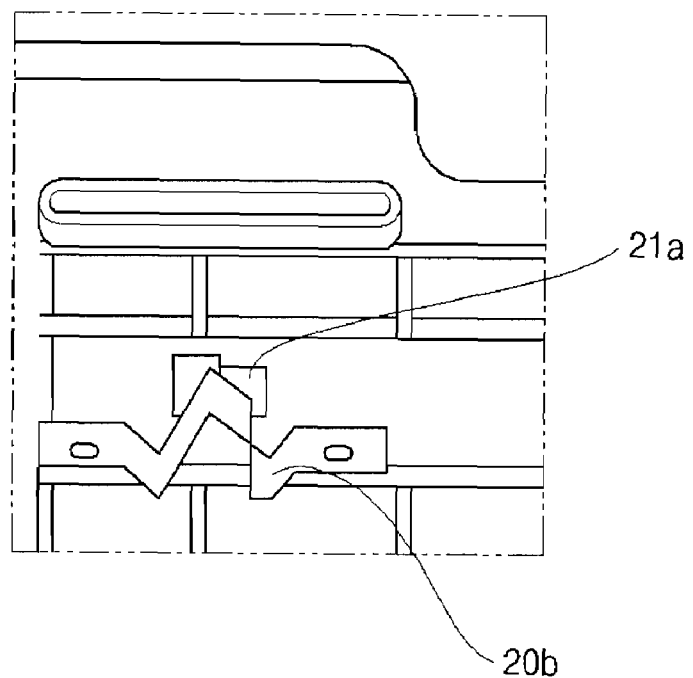

[FIG. 4]
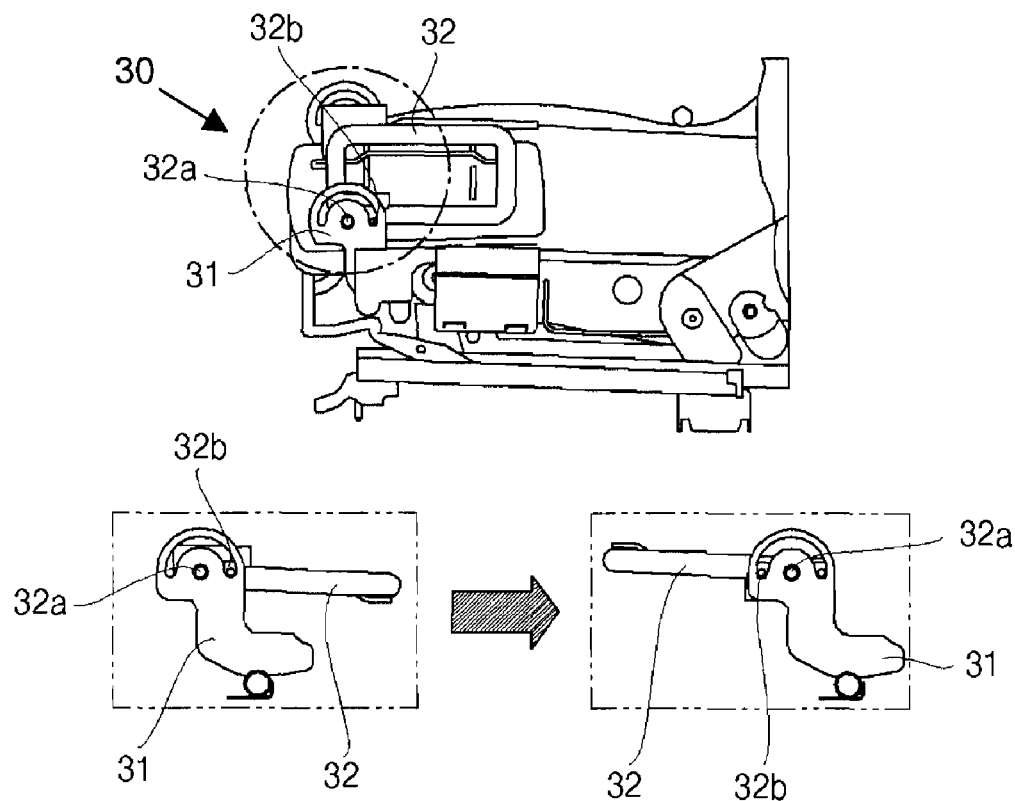
[FIG. 5]
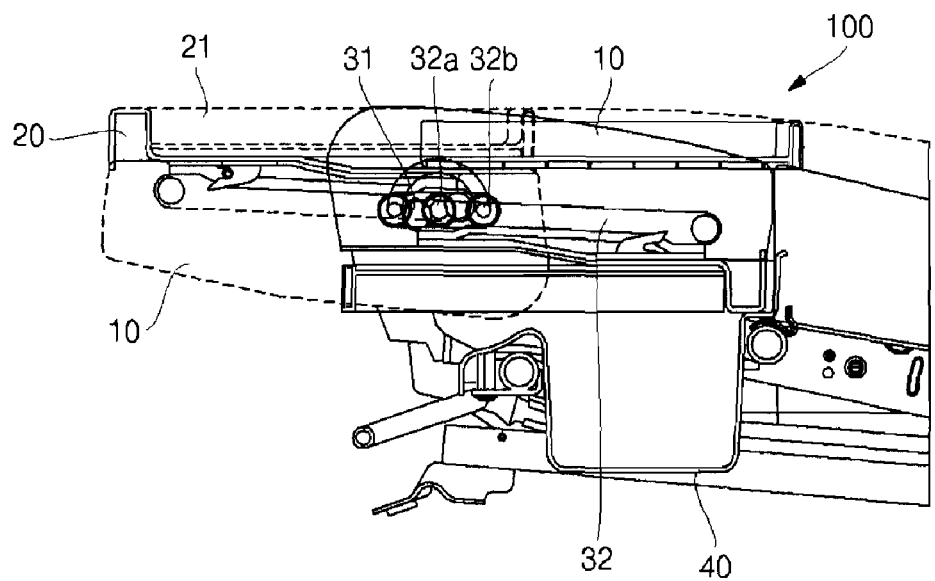

[FIG. 6]
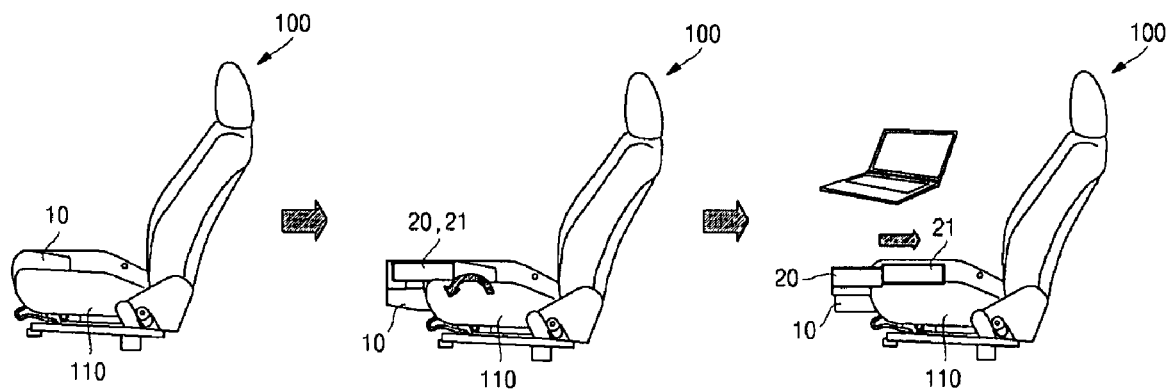

CUSHION TABLE STRUCTURE OF PASSENGER SEAT

CROSS-REFERENCE TO RELATED APPLICATION

This application claims priority to and the benefit of Korean Patent Application No. 10-2006-0124137, filed Dec. 7, 2006, the entire contents of which are incorporated herein by reference.

BACKGROUND OF THE INVENTION (a) Field of the Invention

The present invention relates to a cushion table structure of a passenger seat for a vehicle, and more particularly to a cushion table structure of a passenger seat for a vehicle in which a division structure is provided in a region which does not affect seating comfort and a receiving structure and a table structure are adopted to the division structure.

(b) Background Art

Generally, a seat is provided to a vehicle for supporting a passenger. Most vehicles include a front seat and a rear seat.

A front seat may be a driver seat or a passenger seat each of which is configured to be movable forward and rearward.

A seat may include a seat back and the seat back may include a seat back frame and a headrest. A reclining device may be provided at a lower part of the seat back.

A receiving structure is provided in a front passenger for housing articles or belongings. Numerous types of receiving structures have been suggested.

Among them, U.S. Pat. No. 6,869,121 discloses a seat structure including a center seat interposed between a pair of side seats. The center seat includes a front divided part and a rear divided part. A receiving space is formed when the front part moves forward and rotates. However, the seat structure has a disadvantage in that since the size of the receiving space is insufficient, articles or belongings having a relatively large size cannot stably be put on the receiving space and may easily fall down when a vehicle abruptly stops.

In some cases, a partition is disposed in the receiving space for obtaining two spaces. Adopting a partition may aggravate the above-described problem.

The seat structure has additional disadvantages in that since a rotation center is relatively weak, rotational movement may become loose and a hinge part may be deformed or broken under great load.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a cushion table structure of a passenger seat for a vehicle in which a space of a front passenger seat is divided, a divided part is formed to be rotatable, a sliding table structure is adopted on a rotating cushion surface, a supporter is provided at an inside of a cushion so as to prevent play room at the rotating cushion frame, and a tray structure is applied to a receiving space.

In one aspect, the present invention provides a cushion table structure of a passenger seat for a vehicle, which includes a seat back and a seat cushion, the structure comprising: (a) a division rotating part which is a divided portion of the seat cushion and has a rotatable structure; (b) a fixed type table and a sliding type table which are coupled to a bottom surface of the division rotating part; and (c) a tray which is disposed in an empty space which is generated when the division rotating part rotates in a forward direction.

Preferably, the cushion table structure further comprises a side guider for guiding ends of the fixed type table and the sliding type table so as to form a seating surface.

A suitable side guider may have a structure guiding in a downwardly stepped shape such that bottoms of the two tables become flat after the sliding type table moves.

In a preferred embodiment, a supporter may be provided at an inner side of the division rotating part to support the division rotating part.

A preferred supporter may comprise: hinges which are coupled to both sides of a lower end of the division rotating part in a normal state where the division rotating part is not operated; and a support frame with a pipe shape which rotates about each of the hinges to support the division rotating part.

In a preferred embodiment, the support frame is shaft-connected to each of the hinges through a pair of linear shaft fixing points, one of the linear shaft fixing points being rotatable with respect to a rotating center, and the other of the linear shaft fixing points being rotatable in an arc shape of 180°.

In another preferred embodiment, a fixing stopper may be formed on an upper surface of the fixed type table and a hooking protrusion may be formed at a bottom surface of the sliding type table such that the sliding type table can be locked as it moves by a predetermined distance.

Suitably, a hook may be provided to a front side of the fixed type table.

In another aspect, motor vehicles are provided that comprise a described cushion table structure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like. The present cushion table structures will be particularly useful with a wide variety of motor vehicles.

Other aspects of the invention are discussed infra.

BRIEF DESCRIPTION OF THE DRAWINGS

The present invention will be better understood from reading the description which follows, given by way of non-limiting example, with reference to the attached drawings.

FIG. 1 is a perspective view showing a cushion table structure of a passenger seat for a vehicle according to an exemplary embodiment of the present invention.

FIG. 2 shows a fixed type table and a sliding type table of a cushion table structure of a passenger seat for a vehicle according to an exemplary embodiment of the present invention.

FIG. 3 shows a stopper of a fixed type table and a sliding type table of a cushion table structure of a passenger seat for a vehicle according to an exemplary embodiment of the present invention.

FIG. 4 shows a supporter of a cushion table structure of a passenger seat for a vehicle according to an exemplary embodiment of the present invention.

FIG. 5 is a cross sectional view showing a state in which a cushion table structure of a passenger seat for a vehicle according to an exemplary embodiment of the present invention is not operated and a state in which the cushion table structure is operated.

FIG. 6 is a drawing showing an operation process of a cushion table structure of a passenger seat for a vehicle according to an exemplary embodiment of the present invention.

DETAILED DESCRIPTION

Reference will now be made in detail to the preferred embodiment of the present invention, examples of which are illustrated in the drawings attached hereinafter, wherein like reference numerals refer to like elements throughout. The embodiments are described below so as to explain the present invention by referring to the figures.

FIG. 1 is a perspective view showing an entire assembling structure of a cushion table structure of a passenger seat for a vehicle according to an exemplary embodiment of the present invention, FIG. 2 shows a fixed type table and a sliding type table of a cushion table structure of a passenger seat for a vehicle according to an exemplary embodiment of the present invention, and FIG. 3 shows a stopper of a fixed type table and a sliding type table of a cushion table structure of a passenger seat for a vehicle according to an exemplary embodiment of the present invention.

As shown in FIG. 1, in a preferred embodiment of the present invention, a region of a front passenger seat 100 is divided and a receiving and a table structures are adopted. The receiving structure has a space in which articles and/or belongings can be put and the table structure has a space to give a seat for a driver.

A division structure is adopted in the front passenger seat 100 and it is used as a table structure. A tray 40 with a box shape to receive various articles and/or belongings is disposed within a seat cushion 110 as shown in FIG. 1.

The division structure divides a center portion of the seat cushion 110 in a shape of '⊏' and the divided part comprising a division rotating part 10 is provided with a rotation structure in a hinge type.

As shown in FIG. 2, the division structure includes a fixed type table 20 and a sliding type table 21. The fixed type table 20 is provided with a side guider 20a. The sliding type table 21 has a structure capable of sliding along the side guider 20a. This may be realized by a means known to a person skilled in the art. The sliding type table 21 can be realized by any structure that can move along the side guider 20a.

The side guider 20a of the fixed type table 20 has a downwardly stepped shape, i.e., a crank shape. As a result, bottoms of the tables 20 and 21 become flat when the sliding of the sliding type table 21 is completed.

Accordingly, the front surface of the seat cushion 110 forms a horizontal surface so as to prevent articles and belongings from falling down.

A stopper is provided to a contact surface of the fixed type table 20 and the sliding type table 21 such that the sliding type table 21 may not move any more after the sliding type table 21 moves by a predetermined distance. As shown in FIG. 3, a fixing stopper 20b of a plate spring is formed on an upper surface of the fixed type table 20 and a hooking protrusion 21a is formed at a bottom surface of the sliding type table 21.

The hooking protrusion 21a is capable of being locked to the fixing stopper 20b such that the sliding type table 21 can be locked as it moves by a predetermined distance.

FIG. 4 shows a supporter of a cushion table structure of a passenger seat for a vehicle according to an exemplary embodiment of the present invention. A supporter is provided at a rotating center of the division rotating part 10 for supporting the division rotating part 10. With this supporter, loosening of rotational movement and deformation of a hinge part can be prevented.

That is, as shown in FIG. 4, the supporter includes hinges 31 and a support frame 32. The hinges 31 are coupled to both sides of a lower end of the division rotating part 10 in a state where the division rotating part 10 is not operated.

The support frame 32 rotates about each of the hinges 31 to support the division rotating part 10. The support frame 32 has a pipe shape of a polygon structure, and is configured to support the bottom of the division rotating part 10. The support frame 32 is shaft-connected to each of the hinges 31 through a pair of linear shaft fixing points 32a and 32b. The first point 32a is rotatable with respect to a rotating center and the second point 32b is rotatable in an arc shape of 180°.

FIG. 5 is a cross sectional view showing a state in which a cushion table structure of a passenger seat for a vehicle according to an exemplary embodiment of the present invention is not operated and a state in which the cushion table structure is operated. In case that the division rotating part 10 rotates so that an operation locus thereof moves forward, a receiving space is generated therebetween. The tray 40 with a box shape for receiving relatively large articles and belongings without interference with structures such as a seat track which are applied below the seat 100 is provided.

A hook 45 is coupled to a front side of the fixed type table 20. A shopping bag or the like can be suspended thereto.

Operation of a cushion table structure of a passenger seat for a vehicle according to an exemplary embodiment of the present invention will be explained with reference to the drawings hereinafter.

FIG. 6 is a drawing showing an operation process of a cushion table structure of a passenger seat for a vehicle according to an exemplary embodiment of the present invention.

In a normal state (i.e., a state where the cushion table structure of the front passenger seat 100 is not operated), the division rotating part 10 is placed within a front part of the seat cushion 110.

If the division rotating part 10 of the seat cushion 110 is rotated about the hinge 31 of the supporter 30 which is positioned in front of the seat cushion 110, the division rotating part 10 rotates by 180° so as to be protruded in a forward direction, and the fixed type table 20 and the sliding type table 21 which are positioned below the division rotating part 10 are exposed onto the seat 100.

When the division rotating part 10 is rotated in a forward direction, articles or belongings thicker than the seat cushion 110 and/or higher than the tray 40 can be housed.

When a user intends to use a laptop computer on the front passenger seat 10, an area of the seat cushion 110 can be enlarged by sliding the sliding type table 21 so that the seat cushion 110 can be used as a convenient table.

In addition, in a state where the division rotating part 10 is operated and at the same time the fixed type table 20 and the sliding type table 21 are maintained to be flat, a surface of a glove box of a center fascia and the seat 100 form a large receiving structure, thereby being able to house large articles and belongings.

Accordingly, according to the present invention, a division structure is adopted in a space of the front passenger seat 100 which does not deteriorate seating comfort, and a receiving structure and a table structure are adopted thereto, a space of the front passenger seat 100 can be maximally utilized, and various receiving spaces can be obtained so that a driver can put various articles and belongings on the front passenger seat.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A cushion table structure of a passenger seat for a vehicle, which includes a seat back and a seat cushion, the structure comprising:
    a division rotating part which is a divided portion of the seat cushion and has a rotatable structure;
    a non-slidable base table and a slidable extension table which are coupled to a bottom surface of the division rotating part;
    a tray which is disposed in an empty space which is generated when the division rotating part rotates in a forward direction, and
    wherein the non-slidable base table is provided with a side guider along which the slidable extension table is slidably moveable, the side guider having a downwardly stepped shape such that bottoms of the slidable extension table and the non-sildable base table become flat after the slidable extension table moves;
    a fixing stopper is formed on an upper surface of the non-slidable base table; and
    a hooking protrusion is formed at a bottom surface of the slidable extension table such that the slidable extension table can be locked as the slidable extension table moves by a predetermined distance.

2. The cushion table structure of claim 1, wherein a supporter is provided at an inner side of the division rotating part to support the division rotating part.

3. The cushion table structure of claim 2, wherein the supporter comprises:
    hinges which are coupled to both sides of a lower end of the division rotating part in a normal as where the division rotating part is not operated; and
    a support frame with a pipe shape which rotates about each of the hinges to support the division rotating part.

4. The cushion table structure of claim 3, wherein the support frame is shaft-connected to each of the hinges through a pair of linear shaft fixing points, one of the linear shaft fixing points being rotatable with respect to a rotation center, and the other of the linear shaft fixing points being rotatable in an arc shape of 180°.

5. The cushion table structure of claim 1, wherein a hook is provided to a front side of the non-slidable base table.

6. The cushion table structure of claim 1, wherein a hook is provided to a front side of the non-slidable base table.

* * * * *